United States Patent [19]

Lorenzo

[11] Patent Number: 4,473,038
[45] Date of Patent: Sep. 25, 1984

[54] HOMOGENIZING DEVICE FOR THE INTAKE MIXTURE OF AN INTERNAL COMBUSTION ENGINE

[75] Inventor: Rimoldi Lorenzo, Turate, Italy
[73] Assignee: Alfa Romeo S.p.A., Milan, Italy
[21] Appl. No.: 279,697
[22] Filed: Jul. 2, 1981
[30] Foreign Application Priority Data Jul. 30, 1980 [IT] Italy ................ 23802 A/80

[51] Int. Cl.³ ............................ F02M 35/00
[52] U.S. Cl. ..................... 123/52 M; 123/52 MB
[58] Field of Search ............. 123/52 M, 52 MB, 590

[56] References Cited

U.S. PATENT DOCUMENTS

| | | | |
|---|---|---|---|
| 2,014,371 | 9/1935 | Barker | 123/52 M |
| 3,990,414 | 11/1976 | Malphettes | 123/52 MB |
| 4,098,250 | 7/1978 | Göpel | 123/590 |
| 4,211,191 | 7/1980 | Kawamura et al. | 123/52 M |
| 4,231,329 | 11/1980 | Ishida | 123/52 MB |
| 4,254,746 | 3/1981 | Chiba et al. | 123/52 M |
| 4,356,798 | 11/1982 | Sakaoka et al. | 123/52 M |

FOREIGN PATENT DOCUMENTS

| | | | |
|---|---|---|---|
| 55-87821 | 7/1980 | Japan | 123/52 MB |
| 162083 | 4/1921 | United Kingdom | 123/52 M |
| 431221 | 7/1935 | United Kingdom | 123/52 M |
| 852311 | 10/1960 | United Kingdom | 123/52 M |

*Primary Examiner*—Ethel R. Cross
*Attorney, Agent, or Firm*—Charles E. Brown

[57] ABSTRACT

The invention relates to an improvement in internal combustion engines, by which cavities are provided communicating by way of a respective passage with the intake duct of each cylinder, in order to induce a turbulent movement in the mixture stream drawn in by the engine.

1 Claim, 1 Drawing Figure

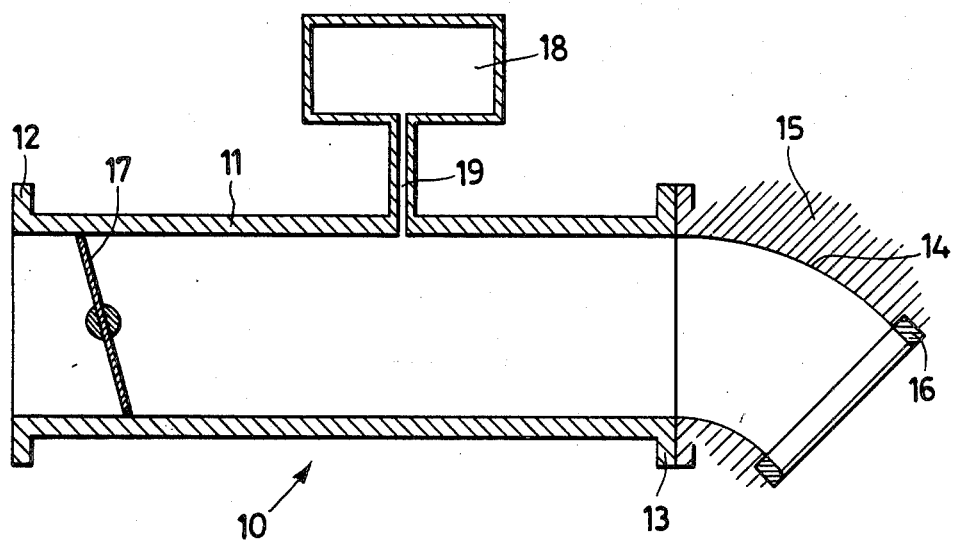

HOMOGENIZING DEVICE FOR THE INTAKE MIXTURE OF AN INTERNAL COMBUSTION ENGINE

This invention relates to a homogenising device for the intake air and petrol mixture of an internal combustion engine, which is able to induce a turbulent movement in the mixture stream.

The present tendency to feed internal combustion engines with weak mixtures in order to keep consumption low is accompanied by the search for means which facilitate their combustion, in order to prevent unburnt polluting substances in the exhaust, and engine performance penalties.

Of the various possible means, the most advantageous are those which tend to improve the characteristics of the intake mixture, and in particular those which favour atomisation of the petrol into very minute droplets so as to form a properly homogeneous mixture with the air.

Besides favouring complete combustion of the mixture in the explosion chamber, proper mixing of the petrol with the air prevents engine operation irregularities from one cycle to another either because of non-uniform feed due to petrol deposits on the walls of the intake ducts or because of random ignition out of phase with the striking of the spark at the spark plug.

Both mechanically operated devices and pneumatically operated devices have been proposed for atomising the petrol and mixing it with the air.

The former are generally provided either with suitably profiled fixed walls or with mobile elements of the blade type, whereas the latter generally comprise a supplementary air jet fed into the intake duct at high speed.

Whereas the devices of the first type have the drawback of producing more or less high pressure drops in the mixture or air stream flowing through the intake duct, especially at high throughputs, those of the second type have no particular disadvantages and in fact appear particularly advantageous. They require only that the adjustment of the intake mixture throughput of the engine and of the air-petrol ratio of the mixture take account of the supplementary air throughput reaching the engine.

The object of the present invention is a pneumatically operated homogenising device able to induce turbulence in the intake air and petrol mixture of an internal combustion engine in which the individual intake ducts feeding the cylinders are provided with a respective throttle valve.

It is well known that in engines of this type, the suction in each intake duct downstream of the throttle valve pulsates strongly and fluctuates between a value close to atmospheric, which is attained during the interval between the successive intake strokes of the cylinder concerned, and the suction peaks which occur during the intake strokes of said cylinder, and which reach very high values when the throttle valve is closed or nearly closed. Consideration has therefore been given to utilising this phenomenon in order to provide a device able to induce a turbulent movement into the intake mixture or air stream of the engine, and for this purpose an accumulation capacity is provided downstream of the throttle in each individual intake duct, and communicating directly with said duct by way of a passage of small cross-section.

Because of the pulsating pressure variation in the individual intake duct, the feed mixture or air fills said accumulation capacity in the interval between the successive intake strokes of the cylinder concerned, whereas it leaves said capacity during the intake stroke of said cylinder, drawn by the strong suction which arises in said intake duct. Because of the presence of said passage of small cross-section, the pressure difference between the accumulation capacity and the intake duct causes the outflow of a jet of mixture or air at high speed which can reach sonic value, at least for part of the intake stroke of the cylinder concerned, if the capacity and the passage of small cross-section are suitably sized. This jet induces strong mixing in the engine intake mixture, to favour atomisation of the petrol in the air.

The volume of said accumulation capacity is small with respect to the total volume of the cylinder and intake duct downstream of the throttle valve, and consequently the device has the advantage over those comprising a supplementary air jet of in practice not influencing the throughput of the engine intake mixture or air or the mixture ratio, which are controlled by the throttle valve and by the petrol metering system, without any modifications being necessary in the setting.

Characteristics and advantages of the invention will be more apparent from an examination of the drawing which is a schematic sectional view through a single intake duct of a multiple cylinder engine and represents a preferred embodiment of the invention by way of the non-limiting example.

In the drawing, the reference numeral 10 indicates overall the intake duct of a cylinder (not shown) of a multi-cylinder internal combustion engine. The duct is constituted by a portion 11 provided with a flange 12 by means of which it is connected directly to the air filter if the engine is injection fed. If the engine is carburettor fed, the duct portion 11 comprises the normal carburettor, i.e. the petrol metering system in addition to the throttle valve 17. The duct portion 11 is also provided with the flange 13 by means of which it is connected to the duct portion 14 provided in the engine head 15 (shown only partly). The reference numeral 16 indicates the seat of the intake valve, not shown, by way of which the intake duct 10 communicates with the respective cylinder.

The throttle valve 17 is rotatably supported in the duct portion 11, and together with the others (not shown) disposed in the individual intake ducts of the other engine cylinders, is operationally connected to the accelerator pedal.

Downstream of the throttle valve 17, the duct portion 11 is connected to the accumulation capacity 18 by way of the tube 19 of small cross-section. The other engine intake ducts, not shown, are also provided with a respective accumulation capacity similar to that indicated by 18, and with a respective connection tube similar to that indicated by 19.

When the engine is in operation, the suction in the intake duct 10 downstream of the throttle valve 17 varies in a pulsating manner between an upper value, which is closer to atmospheric the lower the rotational speed, and a lower value which is lower the more the throttle valve 17 is closed during the interval between the successive intake strokes of the cylinder concerned. While the pressure in the intake duct 10 increases towards said upper value, the engine feed mixture or air penetrates into the accumulation capacity 18 through the tube 19, while any pressure difference exists between the duct and the capacity. During the intake stroke of the cylinder concerned, when the pressure falls in the intake duct 10 towards said lower value, the mixture or air previously stored in the capacity 18 emerges at high speed from said capacity through the tube 19 because of the pressure difference between the capacity and the duct caused because of the small cross-section of said tube 19. The jet speed reaches sonic value at least for part of the intake stroke of the cylinder concerned, if the capacity 18 and tube 19 are suitably sized.

The mixture or air jet leaving the tube 19 induces a turbulent movement in the mixture or air stream flowing through the duct 10, drawn by the intake movement of the piston. This turbulent movement favours atomisation of the petrol in the air, and makes the mixture fed into the engine more homogeneous so improving combustion. This positive effect is also noted if the petrol is injected into the air downstream of the point where the tube 19 opens into the duct 10.

The effectiveness of the jet for the purposes of turbulence depends on its energy, i.e. on the product of its unit kinetic energy and its throughput, and thus, as has been found by calculation and verified experimentally, depends on the ratio $(Va/Vt)$ of the volume of the supplementary capacity 18 to the total volume Vt comprising the volume of the cylinder and the volume of the intake duct 10 downstream of the throttle valve, and also depends on the ratio of the cross-section of the tube 19, Sg, to the volume of the accumulator capacity 18, Va.

According to a preferred design, said ratios lie between the following values:

$$(2/100) < (Va/Vt) < (2/10)$$

$$(1/1000) < (Sg/Va) < (2/1000)[(1/cm)]$$

I claim:

1. A new article of manufacture comprising a homogenising device for the air and petrol intake mixture of a multi-cylinder internal combustion engine in which individual intake ducts are provided with a separate throttle valve, said device including an accumulation capacity for each intake duct communicating solely by way of a single passage of small cross-section as compared with said duct, with said intake duct downstream of said throttle valve, said accumulation capacity having a volume which is a small fraction of the total volume of the cylinder and said intake duct downstream of the throttle valve, the ratio of the volume of said accumulation capacity Va to the total volume Vt of the cylinder and the suction duct downstream of the throttle valve lying between the following values:

$$(2/100) < (Va/Vt) < (2/10)$$

and the ratio of the cross-section Sg of said small cross section passage to the volume Va of the accumulation capacity lies between the following values:

$$(1/1000) < Sg/Va < 2/1000[1/cm].$$

* * * * *